United States Patent Office.

WILLIAM H. CAMP, OF PETERSBURG, VIRGINIA.

ROOFING COMPOSITION.

SPECIFICATION forming part of Letters Patent No. 304,612, dated September 2, 1884.

Application filed March 12, 1884. (No specimens.)

*To all whom it may concern:*

Be it known that I, WILLIAM H. CAMP, a citizen of the United States, residing at Petersburg, in the county of Dinwiddie and State of Virginia, have invented certain new and useful Improvements in Roofing Compositions; and I do hereby declare the following to be a full, clear, and exact description of the invention, such as will enable others skilled in the art to which it appertains to make and use the same.

My invention relates to a roofing composition, or a composition of matter adapted for the protection of metals against oxidation resulting from exposure to atmospheric influences, and for the protection of other materials liable to be injured by exposure to atmospheric influences; and it consists in a compound composed, chiefly, of solid ingredients, capable of being rendered fluid by the application thereto of heat, and adapted for use while in this fluid state.

The invention further consists, as a new article of manufacture and commerce, of a cake or block composed of ingredients capable of being rendered fluid by the application of heat, and employed as a protective agent for protecting metals and other materials against injury by exposure to atmospheric and other influences.

The compound consists, essentially, of asbestus, oxide of lead, (litharge,) oxide of iron, tar, (mineral or other,) sulphur, rosin, and a drier, preferably Japan varnish. In compounding the ingredients I have found the following proportions to give excellent results—namely: asbestus, eight ounces; oxide of lead, oxide of iron, sulphur, and rosin, four ounces each; tar, ten pounds; and Japan varnish, one ounce. The rosin and sulphur in a pulverized or comminuted state are rendered fluid by placing them in a suitable vessel and applying heat thereto, and when in this condition the asbestus and the oxides are added, and the whole intimately mixed. The tar is boiled for a short time in a separate vessel and intimately mixed with the fluid compound of rosin, sulphur, oxides, and asbestus, and finally a drier is added—preferably Japan varnish or other equivalent drier—and the whole intimately incorporated. This will produce a composition of sufficient fluidity to be applied by a brush, and is to be applied while in a heated condition.

The above-described proportions of ingredients produce a paint of great adhesive and protective qualities, yet, under certain conditions, these proportions may be varied, and where a rapidly-drying paint is not desirable, the drier may be omitted, though I prefer to use the same.

In order to better adapt the compound for storage and transportation, and also to be placed on the market as a new article of manufacture and commerce, the composition of matter, after having cooled and become hard, may be comminuted or pulverized, and put up in packages and sold as a pulverulent paint or pigment. I prefer, however, to mold the same in cakes or blocks of any desired form, and of a given weight, and mark or imprint on the same while being molded, or while still sufficiently plastic, a distinctive mark or word or words—such, for instance, as "Camp's Asbestos Paint," or "Asbestos Roofing-Paint," or other like distinctive words—to which the weight of the cake or block may be added, and whereby the compound will be known to the trade and consumers as a new article of manufacture and commerce.

Having now described my invention, what I claim, and desire to secure by Letters Patent, is—

1. The herein-described composition of matter, composed of asbestus, oxide of lead, oxide of iron, sulphur, rosin, and tar, for the purpose specified.

2. As a new article of manufacture, a block composed of the ingredients described, adapted to be reduced to a fluid or semi-fluid by heat, and applied as a protective agent to metals, substantially as described.

In testimony whereof I affix my signature in presence of two witnesses.

WILLIAM H. CAMP.

Witnesses:
CHARLES MCKENNEY,
WILLIAM E. LUM.